(12) United States Patent
Hardin

(10) Patent No.: US 10,948,059 B2
(45) Date of Patent: Mar. 16, 2021

(54) INPUT DRUM FOR TRANSMISSIONS FOR MOTOR VEHICLES

(71) Applicant: David A Hardin, El Monte, CA (US)

(72) Inventor: David A Hardin, El Monte, CA (US)

(73) Assignee: Transgo, LLC, El Monte, CA (US)

( * ) Notice: Subject to any disclaimer, the term of this patent is extended or adjusted under 35 U.S.C. 154(b) by 199 days.

(21) Appl. No.: 16/140,670

(22) Filed: Sep. 25, 2018

(65) Prior Publication Data

US 2019/0113118 A1   Apr. 18, 2019

Related U.S. Application Data

(60) Provisional application No. 62/572,841, filed on Oct. 16, 2017.

(51) Int. Cl.
| | |
|---|---|
| *F16H 57/00* | (2012.01) |
| *F16H 35/10* | (2006.01) |
| *F16D 13/58* | (2006.01) |

(52) U.S. Cl.
CPC .............. *F16H 35/10* (2013.01); *F16D 13/58* (2013.01); *F16H 57/00* (2013.01); *F16H 2057/0075* (2013.01)

(58) Field of Classification Search
CPC .. F16H 35/10; F16H 57/00; F16H 2057/0075; F16D 13/58; F16D 13/644; F16D 13/68
See application file for complete search history.

(56) References Cited

U.S. PATENT DOCUMENTS

| | | | |
|---|---|---|---|
| 4,449,426 A | 5/1984 | Younger | |
| 4,711,140 A | 12/1987 | Younger | |
| 4,790,938 A | 12/1988 | Younger | |
| 5,253,549 A | 10/1993 | Younger | |
| 5,384,949 A * | 1/1995 | Wodrich | B21D 22/16 192/70.2 |
| 5,540,628 A | 7/1996 | Younger | |
| 5,624,342 A | 4/1997 | Younger | |
| 5,730,685 A | 3/1998 | Younger | |
| 5,743,823 A | 4/1998 | Younger | |
| 5,768,953 A | 6/1998 | Younger | |
| 5,820,507 A | 10/1998 | Younger | |
| 5,967,928 A | 10/1999 | Younger | |
| 6,099,429 A | 8/2000 | Younger | |
| 6,117,047 A | 9/2000 | Younger | |
| 6,287,231 B1 | 9/2001 | Younger | |
| 6,390,944 B1 | 5/2002 | Younger | |

(Continued)

*Primary Examiner* — David J Hlavka
(74) *Attorney, Agent, or Firm* — Mark P. Stone

(57) ABSTRACT

An input drum of an automotive transmission for motor vehicles is formed from a plurality of components assembled together. The input drum has a hub having outwardly extending tabs, and a clutch cylinder having internal grooves for receiving the tabs when the hub is assembled to the clutch cylinder. The hub and the clutch cylinder are arranged such that openings in the hub and openings in an inwardly extending circumferential flange of the clutch cylinder are in axial alignment when the tabs of the hub are received in the internal grooves of the clutch cylinder. The hub and clutch cylinder are assembled together by connecting elements extending through the aligned openings in the hub and clutch cylinder. An input shaft is permanently or removably attached to the hub.

17 Claims, 5 Drawing Sheets

(56) References Cited

U.S. PATENT DOCUMENTS

| | | | |
|---|---|---|---|
| 6,565,472 B1 | 5/2003 | Younger | |
| 6,699,157 B2 | 3/2004 | Younger | |
| 6,729,989 B2 | 5/2004 | Younger | |
| 6,814,680 B2 | 11/2004 | Younger | |
| 6,871,397 B2 | 3/2005 | Younger | |
| 6,913,554 B2 | 7/2005 | Younger | |
| 6,920,970 B1* | 7/2005 | Dumas | F16D 25/0638 192/70.2 |
| 6,964,628 B2 | 11/2005 | Younger | |
| 7,128,679 B2 | 10/2006 | Younger | |
| 7,204,357 B1* | 4/2007 | Dumas | F16D 25/0638 192/70.12 |
| 7,331,893 B2 | 2/2008 | Younger | |
| 8,857,592 B2* | 10/2014 | Mangiagli | F16D 13/683 192/70.13 |
| 9,429,228 B2 | 8/2016 | Younger | |
| 9,970,534 B2 | 5/2018 | Younger | |
| 10,690,194 B2* | 6/2020 | Smith | F16D 13/70 |
| 2018/0066715 A1* | 3/2018 | Cupit | F16D 13/52 |

\* cited by examiner

INPUT DRUM FOR TRANSMISSIONS FOR MOTOR VEHICLES

BACKGROUND OF THE INVENTION

The present invention is directed to an improved input drum for automatic automotive transmissions for motor vehicles. The improved input drums are particularly adapted to "factory installed" automotive transmissions identified as "4L60", "4L60E", "4L65E", "4L70E", "700", and "700R4" installed in vehicles manufactured by General Motors Corporation of Detroit, Mich.

The input drums of the "factory installed" transmissions, as illustrated by FIG. 1, are formed from a one piece machined drum designated by reference numeral 2, cast from aluminum. A spline steel input shaft, designated by reference numeral 4, is press fitted into the aluminum casting. As input torque and horsepower increase, so do failures of the single piece input drum. The weak areas of the drum, as indicated by reference numeral 5 in FIG. 1, are the hub to clutch cylinder and the input shaft spline areas.

SUMMARY OF THE INVENTION

The primary object of the present invention is to modify the single piece input drum of the "factory installed" transmissions with a drum formed from multiple components which are assembled in a manner to increase the strength of the drum by eliminating the weak points of the single piece drum of the "factory installed" transmissions, thereby reducing or eliminating failure of the input drum at increased input torque and increased horsepower. The improved input drum of the present invention also increases the efficiency of the transfer of rotational energy to the cylinder of the drum, as compared to the single piece "factory installed" input drum.

DESCRIPTION OF THE BEST MODES FOR CARRYING OUT THE INVENTION

Figure 1:
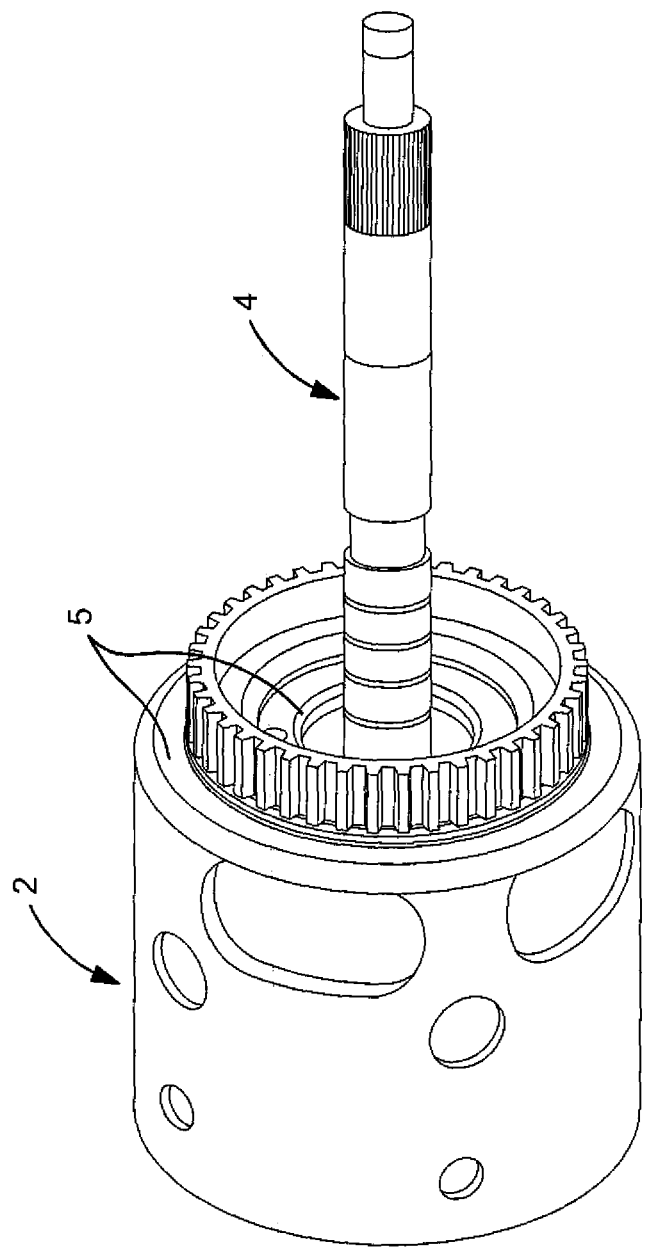
FIG. 1 is a perspective view of a prior art single piece input drum for the transmission of an automotive vehicle.
Figure 2:
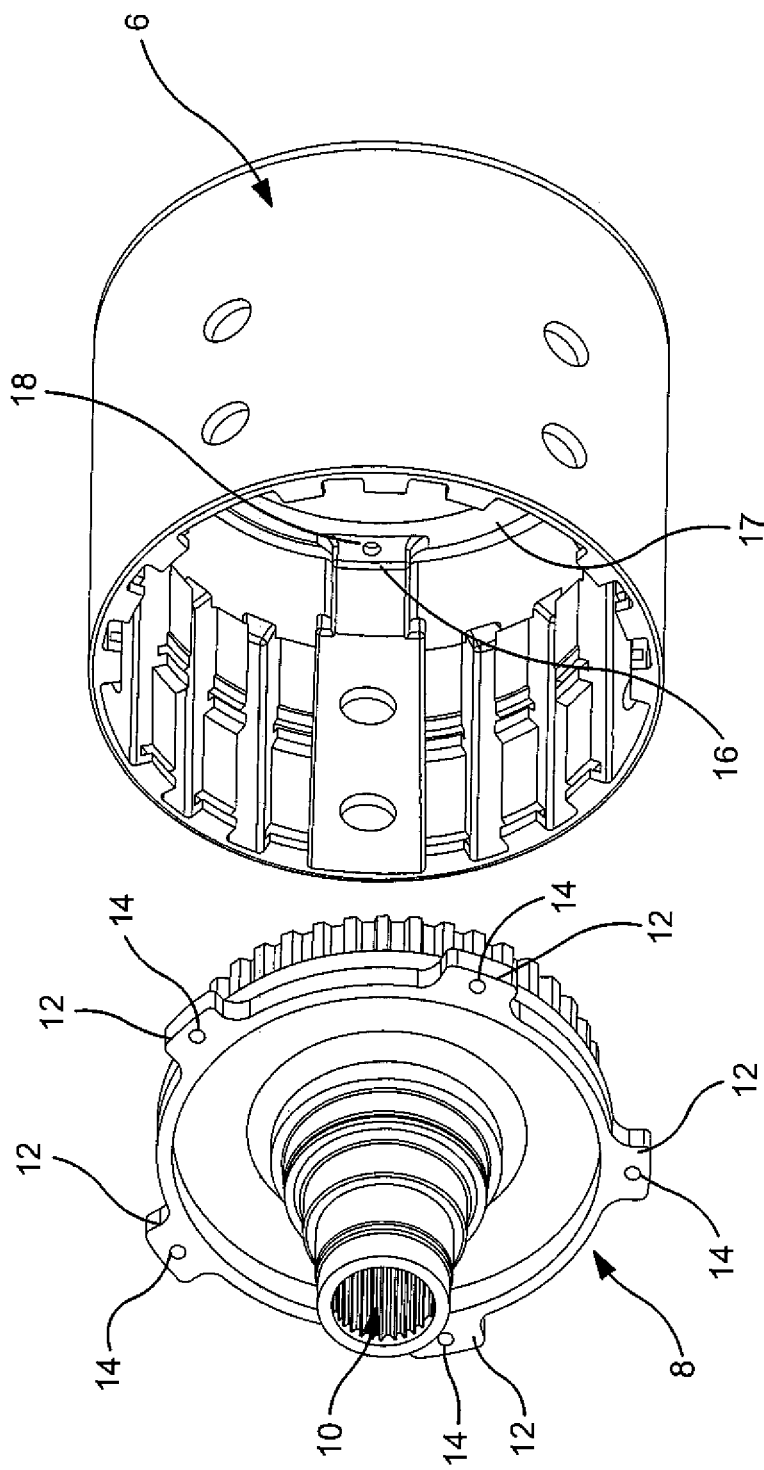
FIG. 2 is an exploded perspective view of a first embodiment illustrating a rear view of a two piece input drum in accordance with the present invention.
Figure 3:
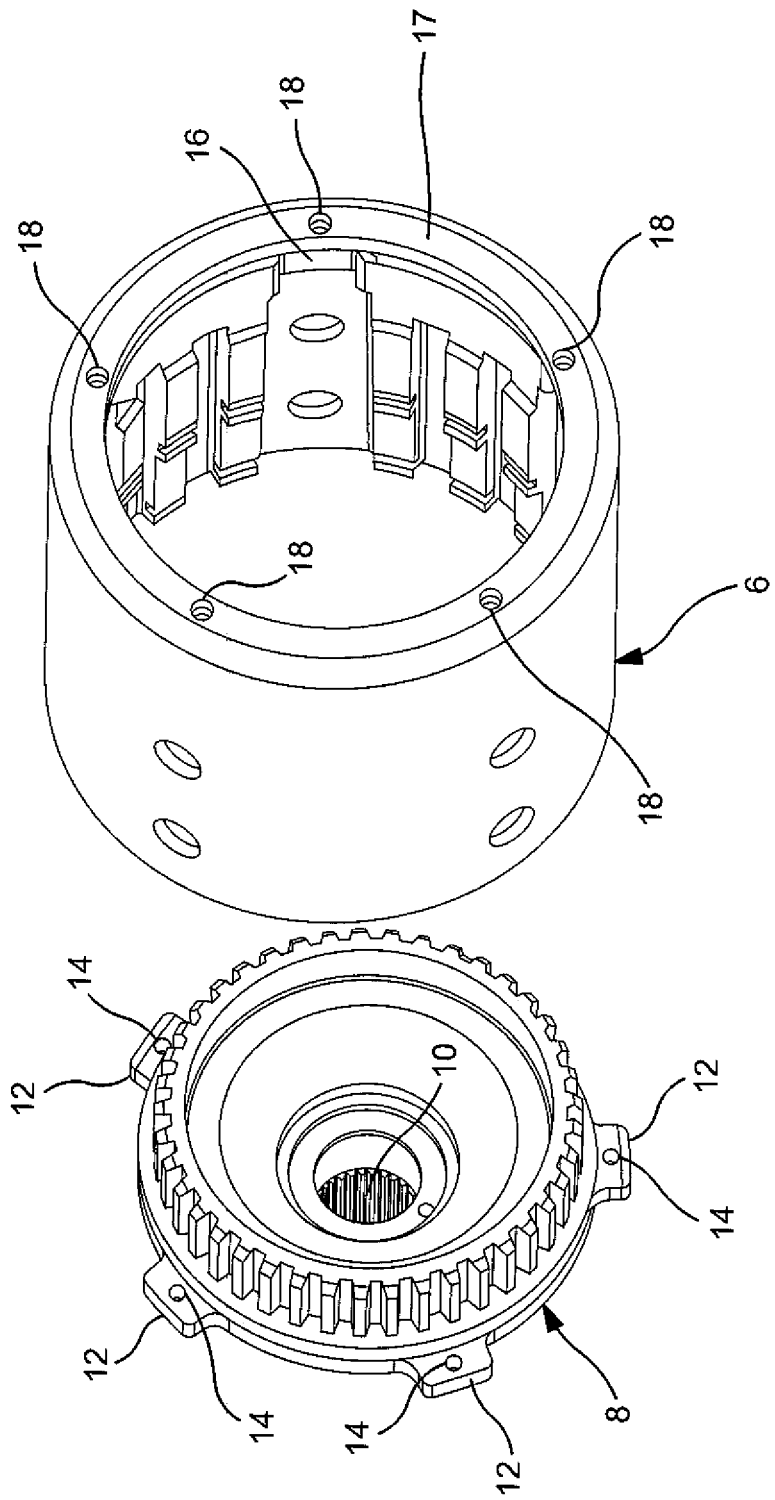
FIG. 3 is an exploded perspective view of the first embodiment illustrating a front view of a two piece input drum in accordance with the present invention.
Figure 4:
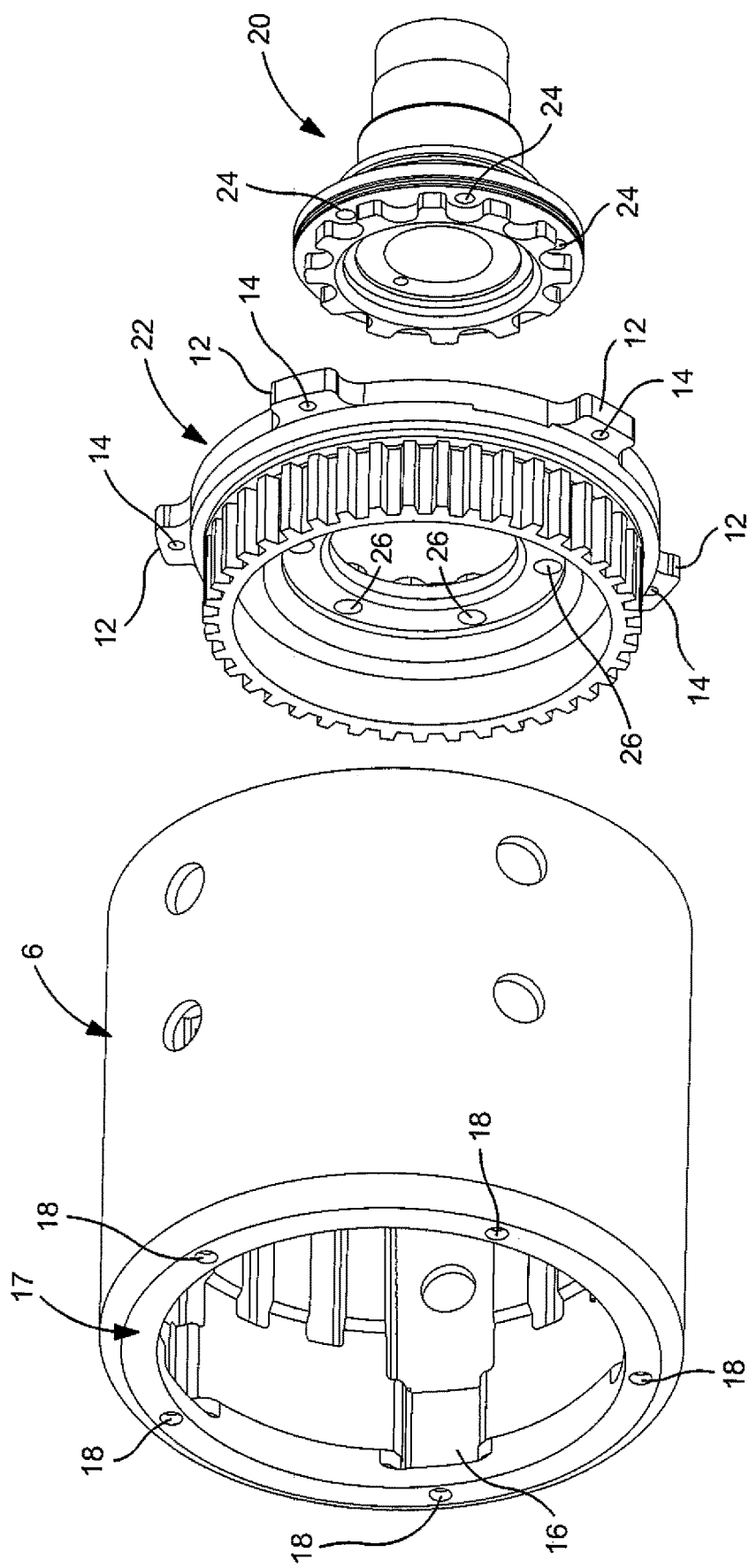
FIG. 4 is an exploded perspective view of a second embodiment illustrating a rear view of a three piece input drum in accordance with the present invention.
Figure 5:
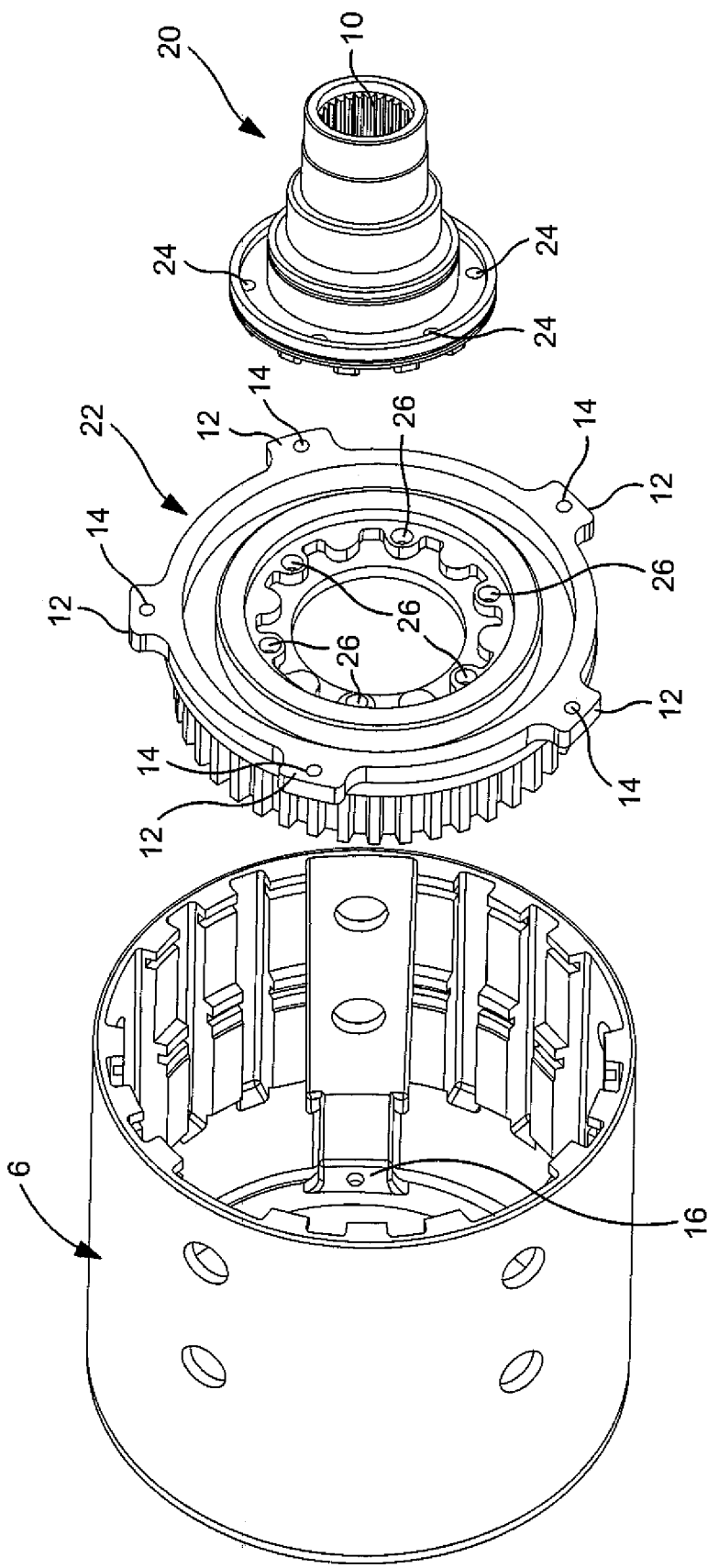
FIG. 5 is an exploded perspective view of the second embodiment illustrating a front view of a three piece input drum in accordance with the present invention.

FIGS. 2 and 3 illustrate a first embodiment of the improved input drum in accordance with the present invention, while FIGS. 4 and 5 illustrate a second embodiment of the improved input drum in accordance with the present invention.

The first embodiment provides an input drum formed from 2 components, while the second embodiment provides an input drum formed from 3 components.

FIGS. 2 and 3 illustrate, respectively, rear and front exploded views of a clutch cylinder designated by reference numeral 6 and a hub designated by reference numeral 8, forming the 2 components of the improved input drum.

The clutch cylinder 6 is preferably formed from aluminum, and the hub 8 is preferably formed from steel. However, both components can also be formed from high strength aluminum. The hub 8 has an input shaft spline area, designated by reference numeral 10, for receiving an input shaft which can be permanently or removably attached to the hub. The hub 8 also includes a plurality of equidistantly spaced, outwardly extending peripheral tabs designated by reference numerals 12. Although the drawings illustrate five tabs 12, the number of tabs can vary. Each tab 12 defines a central opening 14.

A plurality of internal, circumferentially oriented depressions such as grooves or slots, designated by reference numeral 16, are defined in the inner surface of the cylinder 6. The grooves or slots 16 are spaced equidistantly from each other, and correspond in number, arrangement and spacing to the tabs 12 extending from the hub 8. One end of the cylinder 6 forms an inwardly directed, peripheral, circumferential flange 17 defining therein a plurality of equidistantly spaced openings designated by reference numerals 18. The openings 18, which are defined forwardly of the grooves or slots 16, correspond in number, arrangement, and spacing with the openings 14 in the tabs 12 extending outwardly from the hub 8.

The hub 8, as illustrated by FIG. 3, is received and centered in the cylinder 6 and moved forward relative to the cylinder in a rightward direction as shown by FIG. 3. (Longitudinal grooves for receiving the tabs and guiding the movement of the hub in the cylinder may be provided in the inner surface of the cylinder). The plurality of tabs 12 on the hub 8 are aligned with the grooves 16 in the cylinder 6, and the hub 8 is moved towards the front of the cylinder such that the tabs are received and retained in the respective corresponding internal grooves or slots 16 in the cylinder, thereby securing and fixing the position of the tabs 12 relative flange 17 of the cylinder 6. Further movement of the hub relative to the cylinder (both linear and rotational) is prevented as a result of the tabs being received in the grooves. The peripheral flange at the forward end of the cylinder also acts as a stop to prevent any further forward movement of the hub within the cylinder once the tabs are received in the grooves when the hub has been moved within the cylinder to a position adjacent to the flange. When the tabs 12 are received within the grooves or slots 16, the openings 14 in the tabs 12 of the hub 8 are each in axial alignment with corresponding openings 18 in the flange 17 of the cylinder 6 when the tabs 12 of the hub are moved into contact with the flange 17 of the cylinder. A plurality of bolts are then received in the respective aligned openings 14 and 18 to securely connect the hub to the cylinder, thereby forming the assembled two piece input drum. Preferably, the bolts are inserted through the aligned openings from the front of the flange 17. Instead of bolts, the aligned openings can be threaded so that the hub and cylinder are screwed together in the assembled configuration of the drum, or other suitable attachment means can be employed.

The assembled two piece input drum provides increased strength as compared to the "factory installed" input drum in several different ways. The two components are securely connected to each other as a result of the outwardly extending tabs on the hub being received and retained in the corresponding internal grooves or slots defined within the cylinder, and further as a result of bolting the two components together through the aligned openings in the tabs on the hub and in the inwardly directed circumferential flange defined at the forward end of the cylinder.

The arrangement by which the tabs on the hub are received and retained in corresponding grooves or slots in the cylinder when the two components are bolted together, in addition to increasing the strength of the assembled input drum as compared to the single piece "factory installed" input drum, more efficiently transfers rotational energy to the cylinder as a result of the secure connection between the hub and the cylinder.

FIGS. 4 and 5 illustrate a second embodiment of the present invention in which the improved input drum is formed from 3 separate components which are assembled together. The same references numerals are used for components which correspond to the same components illustrated by FIGS. 2 and 3.

FIGS. 4 and 5 are exploded perspective views of the improved input drum, in accordance with the second embodiment of the present invention.

Instead of a hub formed from a single component as illustrated by FIGS. 2 and 3, the hub illustrated by FIGS. 4 and 5 is formed from 2 separate components, generally designated by reference numerals 20 and 22. Component 20 is an end component having an input shaft spline area, while component 22 is an intermediate component having outwardly extending, equidistantly spaced, tabs 12, each of the tabs defining a central opening 14 therein. Equidistantly spaced openings 24 are defined near the periphery of the end component 20, while equidistantly spaced openings 26 are defined within the intermediate component 22. The openings 24 and 26 are the same in number and arrangement so that these openings are in axial alignment with each other when component 20 is received within component 22 by moving component 20 in a leftward direction as seen in FIGS. 4 and 5. When the openings 24 and 26 are moved into axial alignment with each other, components 20 and 22 are bolted together by bolts received in the aligned openings 24 and 26, resulting in a single component formed by the assembled components 20 and 22. The aligned openings can also be threaded so that the components 20 and 22 can be screwed together.

The single component now formed from the assembled components 20 and 22 is received and centered within the cylinder 6, and moved towards the front of the cylinder in a leftward direction as illustrated by FIGS. 4 and 5 until the tabs 12 are received in the internal grooves 16 in the inner surface of the cylinder. When the single component reaches the front of the cylinder, the tabs 12 are received and retained within the corresponding internal grooves 16 in the cylinder, and further movement of the single assembled component relative to the cylinder is prevented. In this position, the tabs on the single component are adjacent to the inwardly directed, circumferential flange 17 at the front end of the cylinder, which also serves as a stop to prevent further forward movement of the single assembled component relative to the cylinder. When the tabs of the single assembled component are received and retained in the corresponding internal grooves in the cylinder and the tabs are adjacent to and contact the inwardly directed flange of the cylinder, the openings 14 in the tabs 12 of the intermediate component 22 are axially aligned with the openings 18 in the flange 17 of the cylinder 6. The single component formed from the assembled components 20 and 22 is then bolted to the cylinder by bolts received through the aligned openings 14 and 18 to form the assembled input drum. Instead of bolts, the aligned openings can be threaded so that assembled components are screwed together, or other suitable attachment means can be used.

Components 20 and 22 can be formed from steel, and the cylinder 6 can be formed from aluminum. However, both components 20 and 22, as well as the cylinder 6, can each be formed from high strength aluminum.

The input drum formed from the assembly of the three components discussed with respect to FIGS. 4 and 5 increases the strength of the "factory installed" input drum, and provides a more efficient transfer of rotational energy to the cylinder, for the same reasons as the input drum formed from the two components as discussed with respect to FIGS. 2 and 3.

Although in the preferred embodiments of the invention the hub is formed from steel and the cylinder is formed from aluminum, or all components are formed from aluminum, other metals, and combinations of metals, can be employed to form these components of the improved input drums in accordance with the present invention.

The invention claimed is:

1. A method for modifying an automotive transmission for a motor vehicle, said automotive transmission including an input drum formed from a single piece, the steps of said method comprising:
   removing said single piece input drum from said automotive transmission;
   replacing said single piece input drum with an input drum formed from a plurality of assembled pieces;
   wherein a first piece is a hub having outwardly extending apertured tabs, and a second piece is a clutch cylinder having internal grooves,
   the steps of said method further comprising:
   assembling said hub and clutch cylinder together by providing sliding relative movement between the hub and the clutch cylinder so that the hub is received in the clutch cylinder for preventing linear and rotational relative movement between the hub and the clutch cylinder when the tabs of said hub are received in the internal grooves of said clutch cylinder;
   providing said clutch cylinder with an internal inwardly extending apertured flange such that openings in said tabs are in axial alignment with openings in said internal flange, respectively, when the tabs of said hub are received in the internal grooves of said clutch cylinder; and
   attaching the hub to the clutch cylinder by attachment elements extending through the aligned openings in the tabs of said hub and in the internal flange of said clutch cylinder, respectively, when the tabs of said hub are received in the internal grooves of said clutch cylinder.

2. The method as claimed in claim 1, wherein the step of providing sliding relative movement between the hub and the clutch cylinder includes the step providing at least one internal longitudinal groove in said clutch cylinder for receiving at least one said tab of the hub for guiding linear movement of the hub relative to the clutch cylinder.

3. The method as claimed in claim 1, wherein the step of replacing said single piece drum includes the step of replacing said single piece drum with a drum formed from three pieces assembled together.

4. The method as claimed in claim 1, further including the step of providing a connecting element on said hub for connecting an input shaft to said hub.

5. The method as claimed in claim 4, including the step of forming said clutch cylinder and said hub from aluminum.

6. The method as claimed in claim 4, including the step of forming said clutch cylinder from aluminum and forming said hub from steel.

7. The method as claimed in claim 3, further including the steps of forming said hub from first and second hub components, providing said second hub component with a connecting element for connecting an input shaft to said second hub component, and assemblying said input drum such that said first hub component is disposed between the clutch cylinder and said second hub component.

8. An input drum for the automotive transmission of a motor vehicle, said input drum being formed from a plurality of separate components, said separate components including a clutch cylinder and a hub assembled together,
   wherein said clutch cylinder has an inwardly extending apertured flange and an internal groove, and said hub has an outwardly extending apertured tab,
   wherein said hub and said clutch cylinder are arranged such that an opening in said tab of said hub is axially aligned with an opening in said flange of said clutch cylinder when said tab of said hub is received in said internal groove of said clutch cylinder for receiving a connecting element extending through said axially aligned openings in said tab and said flange for connecting the hub to the clutch cylinder.

9. The input drum as claimed in claim 8, wherein the clutch cylinder defines at least one internal longitudinal groove for receiving at least one said tab of the hub for guiding linear movement of the hub relative to the clutch cylinder.

10. An input drum for the automotive transmission of a motor vehicle, said input drum being formed from a plurality of separate components, said separate components including a clutch cylinder and a hub assembled together,
    wherein said hub includes at least one outwardly extending apertured tab, and said clutch cylinder has at least one internal groove for receiving said tab of said hub when said hub and said clutch cylinder are assembled together,
    wherein said clutch cylinder has an inwardly extending apertured flange, and
    wherein said hub and said clutch cylinder are arranged such that an opening in said tab is axially aligned with an opening in said flange in said clutch cylinder when said tab of said hub is received in said internal groove of said clutch cylinder, and
    wherein said hub is attached to said clutch cylinder by an attachment element extending through said aligned openings in said hub and said clutch cylinder.

11. The input drum as claimed in claim 10, wherein said hub includes a connecting element for connecting an input shaft to said hub.

12. The input drum as claimed in claim 11, wherein said hub is formed from steel and the clutch cylinder is formed from aluminum.

13. The input drum as claimed in claim 11, wherein the clutch cylinder and the hub are each formed from aluminum.

14. An input drum for an automotive transmission of a motor vehicle, said input drum comprising a clutch cylinder and a hub assembled together, wherein said hub includes a plurality of outwardly extending apertured tabs, and said clutch cylinder has a plurality of corresponding internal grooves for receiving said tabs of said hub for preventing linear and rotational relative movement between the hub and the clutch cylinder when said hub and said clutch cylinder are assembled together, said clutch cylinder having an inwardly extending apertured flange arranged such that openings in said flange of said clutch cylinder are axially aligned with corresponding openings in said tabs of said hub for receiving a connecting element extending through the axially aligned openings in said tab and said flange for connecting the hub to the clutch cylinder when said tabs of said hub are received in said corresponding internal grooves of said clutch cylinder.

15. The input drum as claimed in claim 14, wherein the clutch cylinder defines at least one internal longitudinal groove for receiving at least one said tab of the hub for guiding linear movement of the hub relative to the clutch cylinder.

16. An input drum for the automotive transmission of a motor vehicle, said input drum being formed from a plurality of separate components, said separate components including a clutch cylinder and a hub assembled together,
    wherein said hub includes at least one outwardly extending apertured tab, and said clutch cylinder has at least one internal groove for receiving said tab of said hub when said hub and said clutch cylinder are assembled together,
    wherein said hub is formed from first and second hub components assembled together such that said first hub component includes said at least one outwardly extending apertured tab and said second hub component includes a connecting element for connecting an input shaft to said second hub component,
    wherein said clutch cylinder and said first and second hub components are arranged in an assembled configuration such that said first hub component is disposed between said clutch cylinder and said second hub component.

17. An input drum for the automotive transmission of a motor vehicle, said input drum being formed from a plurality of separate components, said separate components including a clutch cylinder and a hub assembled together,
    wherein said hub includes at least one outwardly extending apertured tab, and said clutch cylinder has at least one internal groove for receiving said tab of said hub for preventing linear and rotational relative movement between the hub and the clutch cylinder when said tab is received in said internal groove when said hub and said clutch cylinder are assembled together, wherein the clutch cylinder defines at least one internal longitudinal groove for receiving at least one said tab of the hub for guiding linear movement of the hub relative to the clutch cylinder.

* * * * *